July 3, 1951 D. F. HYLAND 2,559,434
CUTTING GUIDE FOR CUTTING FISHING BAIT
Filed Oct. 2, 1948 2 Sheets-Sheet 1

Daniel F. Hyland,
Inventor.
Haynes and Koenig
Attorneys.

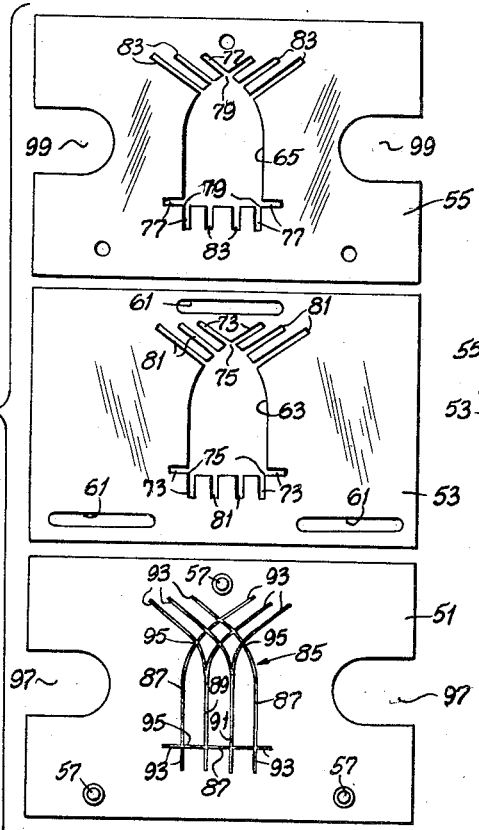
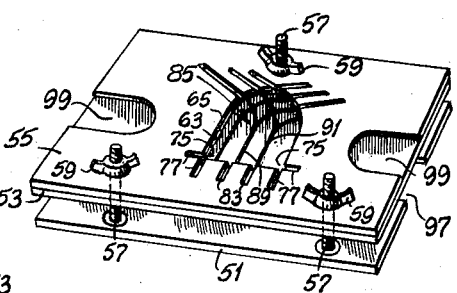
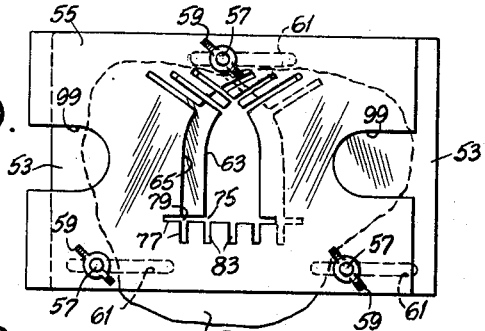
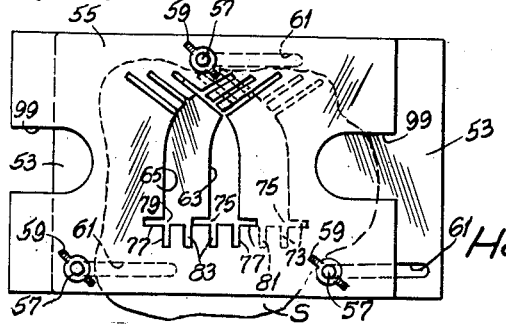

Patented July 3, 1951

2,559,434

UNITED STATES PATENT OFFICE 2,559,434

CUTTING GUIDE FOR CUTTING FISHING BAIT

Daniel F. Hyland, St. Louis, Mo.

Application October 2, 1948, Serial No. 52,560

11 Claims. (Cl. 146—150)

This invention relates to cutting guides for cutting fishing bait, and more particularly to such devices for cutting bulk bait-forming material to the outlines of various fishing baits.

Among the several objects of the invention may be noted the provision of cutting guides for facilitating the cutting with a cutting blade (such as a knife) of bulk sheets or slabs of suitable bait-forming material, such as pork rind, for example, to form fishing baits of various outlines; the provision of guides of the class described adapted for cutting of the material in outlines having sharp corners; the provision of guides of this class which may be readily carried by the fisherman for use in the field to cut a variety of baits from various suitable bulk materials that may be available; and the provision of guides such as described which are economical to make, durable, and easy to use. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a top plan view of a guide of this invention, illustrating its use to cut baits with one of two templates thereof;

Fig. 7 is an exploded view of an alternative form of the invention which is adjustable to form baits of different outlines;

Fig. 8 is a perspective view of the assembled guide of Fig. 7 in a first position of adjustment;

Fig. 10 is a plan view of the assembled Fig. 7 guide in a second position of adjustment;

Fig. 12 is a plan view of the assembled Fig. 7 guide in a third position of adjustment; and, Fig. 13 is a perspective view of a bait cut with the guide of Fig. 7 in its Fig. 12 position of adjustment.

Similar reference characters indicate corresponding parts throughout the several views of the drawings.

Figure 1:
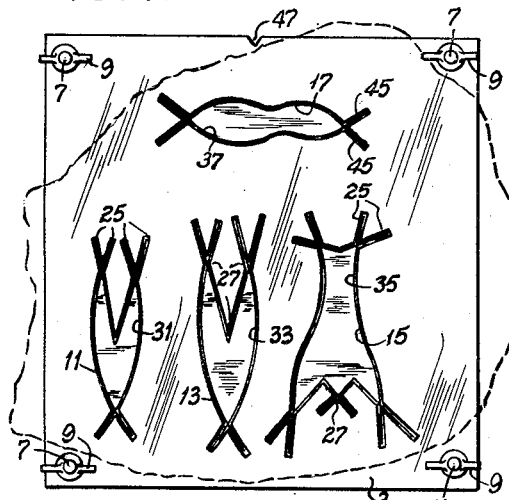
Figure 2:
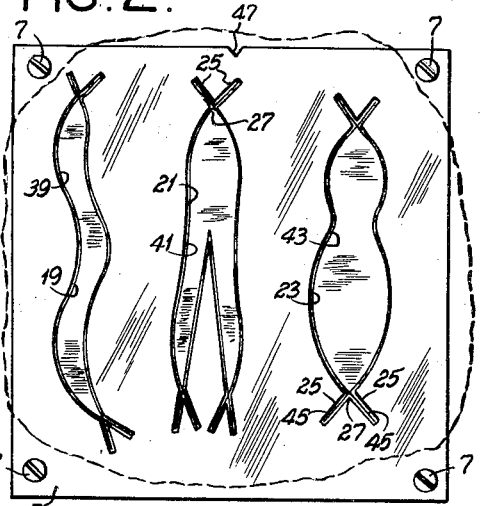
Fig. 2 is a bottom plan view of the Fig. 1 guide, illustrating its use to cut baits with the other template.

Referring to the drawings, Figs. 1–5 illustrate a cutting guide of this invention comprising a double clamp having a cutting board 1 as an intermediate jaw and templates 3 and 5 as outer jaws for clamping bulk sheets or slabs of suitable bait-forming material (such as pork rind, sheet plastic material, discarded pieces of fish, etc.) between the cutting board and templates. The templates are retained in association with the cutting board and are adapted to be drawn toward opposed faces of the board by means of clamp bolts 7 extending through the corners of the assembly and having wing nuts 9 threaded thereon.

The template 3 has a number of apertures 11, 13, 15 and 17 corresponding in outline to the outlines of different shapes of baits which it may be desired to cut. Similarly, the template 5 has a number of apertures 19, 21 and 23 corresponding in outline to the outlines of other baits which it may be desired to cut. As illustrated, the guide may be used to cut seven different bait figures, four of relatively small sizes using template 3, three of relatively large sizes using template 5. Each template is also provided with paired slots, designated by reference character 25 in each instance, forming a continuation of the marginal edges of the apertures therein at all corners 27 of the apertures. These paired slots intersect at such corners and diverge from one another away from such corners.

The cutting board is provided in one of its faces with a number of blade-receiving grooves 31, 33, 35 and 37 following the outlines of the apertures 21, 23, 25 and 27, and defining figures slightly smaller than the apertures so that the grooves are located just within the margins of the apertures. The other face of the cutting board similarly is provided with blade-receiving grooves 39, 41 and 43 following the outlines of apertures 19, 21 and 23. In each instance, the grooves in the faces of the cutting board are continued, as indicated at 45, at the corners of the figures thereby defined with the continuations of the grooves in alignment with the slots 35 in the templates.

To facilitate assembly of the templates with the cutting board in such manner that the apertures in the templates are properly aligned with the respective grooves in a cutting board, the templates and the cutting board are provided with aligned notches as indicated at 47 in corresponding edges thereof. If the guide is completely disassembled, reassembly thereof with the cutting board and templates in proper relation is facilitated by assembling these parts with the notches in alignment.

Figure 3:
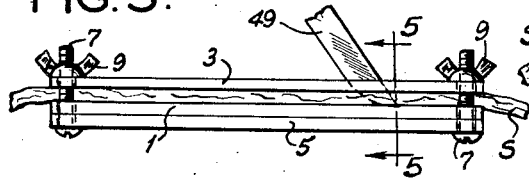
Fig. 3 is a view in elevation of Fig. 1 showing a knife applied.
Figure 4:
Fig. 4 is a view in elevation of Fig. 2 showing a knife applied.
Figure 5:
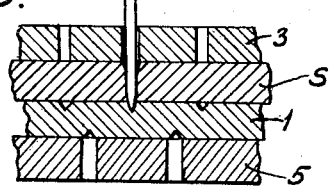
Fig. 5 is an enlarged fragmentary section taken substantially on line 5—5 of Fig. 3.
Figure 6:
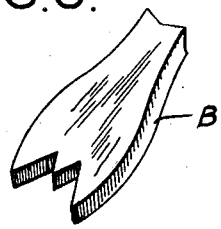
Fig. 6 is a perspective of one of the baits which may be cut with the guide of Fig. 1.

In using the guide to cut bait, the cutting board and templates are separated by loosening the wing nuts 9, and a sheet or slab of bait-forming material S is inserted between one of the templates and the cutting board. Fig. 3 illustrates how the bulk bait material is clamped between template 3 and the cutting board for cutting baits in the outline of any one of apertures 11, 13, 15 or 17. Fig. 4 illustrates how the material is clamped between template 5 and the board for cutting baits in the outline of any one of apertures 19, 21 or 23. The wing nuts are tightened firmly to clamp the material between template and cutting board. The point of a cutting blade 49 is then inserted into the aperture in the template corresponding to the bait figure which it is desired to cut, and the blade is drawn along the margin of the aperture with its point guided in the groove in the face of the cutting board to cut through the bait-forming material in the outline of the figure. At the corners of the figure, the blade is drawn into the slots 25. This cuts the bait figure with clean, sharp corners, and permits ready removal thereof through the aperture in the template. Fig. 6 illustrates a bait figure B cut through the aperture 15.

It will be understood that more or fewer apertures may be provided in each of the two templates. It will also be understood that the guide may comprise a single clamp having only one template in association with the cutting board. Or the guide may have more faces than two, such as for example six faces of a cube, with a corresponding number of templates (six) for example.

Figs. 7, 8, 10 and 12 illustrate a second embodiment of the invention comprising an appliance generally similar to that of Figs. 1–5, but having an adjustable template aperture for cutting sharp-cornered bait figures of generally similar form but of different sizes. As shown, this appliance comprises a single clamp having as one jaw thereof a cutting board 51 and as the other jaw a pair of relatively adjustable templates 53 and 55, all of similar rectangular outline. The templates lie flat against one another. They are retained in association with the cutting board, and are adapted to be drawn toward the upper face of the board, by means of clamp bolts 57 extending through the templates and having wing nuts 59 threaded thereon to clamp a sheet or slab of bait-forming material S between the intermediate template 53 and the upper face of the board. The intermediate template 53 constitutes an adjustable slide, being mounted for sliding adjusting movement transverse to the direction of clamping movement by having the clamping bolts 57 extend through elongate slots 61 therein.

The slide 53 and the template 55, which is fixed relative to the slide, are provided with apertures 63 and 65, preferably of identical outline. The slide may be positioned relatively to the template 55 with the margins of these apertures in alignment (Fig. 8) to provide in effect a single aperture through both the template and slide having the full outline of both apertures 63 and 65. This provides a pattern for insertion of a cutting blade to cut a bait figure of maximum size from a sheet or slab of bait-forming material clamped between the template-slide assembly and the cutting board. The slide may be adjusted to block off part of the aperture 65 in template 55, thereby reducing the size and outline of the aperture leading through the template-slide assembly to provide other patterns for cutting other bait figures.

Figure 9:
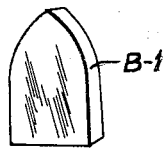
Fig. 9 is a perspective view of a bait cut with the guide of Fig. 7 in its Fig. 8 position of adjustment.
Figure 11:
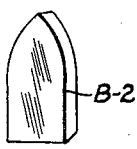
Fig. 11 is a perspective view of a bait cut with the guide of Fig. 7 in its Fig. 10 position of adjustment.
Figure 13:
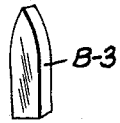

As illustrated, the slide 53 is particularly adapted for adjustment to the three different positions illustrated in Figs. 8, 10 and 12 for cutting the three different bait figures illustrated in Figs. 9, 11 and 13. With the slide in its Fig. 8 position, apertures 63 and 65 are wholly marginally aligned for cutting a bait B-1 of maximum size (Fig. 9). With the slide in its Fig. 10 position, it partially blocks aperture 65 to provide a pattern for cutting a bait B-2 of intermediate size (Fig. 11). With the slide in its Fig. 12 position, it blocks aperture 65 to a greater extent to provide a pattern for cutting a bait B-3 of small size (Fig. 13).

Provision is made for enabling the user to cut any of these baits with sharp corners. As shown, the slide 53 has slots 73 forming continuations of the marginal edges of the aperture 63 therein at all the sharp corners 75 of this aperture. Template 55 similarly has slots 77 forming continuations of the marginal edges of the aperture 65 therein at all the sharp corners 79 of the aperture. With the slide in its Fig. 8 position, slots 77 are aligned with slots 73 to enable the user to draw the cutting blade past the sharp corners through the aligned slots to cut clean sharp corners. The slide 53 also has additional slots 81 leading outward from the marginal edge of the aperture 63 therein in such position as to form continuations of the unblocked portion of the marginal edge of the aperture 65 in template 55 when the slide is in its Figs. 10 and 12 positions. The template 55 similarly has additional slots 83 leading outward from the marginal edge of its aperture 65 in such position as to form continuations of the unblocked portion of the marginal edge of the aperture 63 in slide 53 and aligned with corresponding slots 81 in the slide when the slide is in its Figs. 10 and 12 positions.

The cutting board 51 is provided with a pattern of blade-receiving grooves 85 following the outlines of the three different bait figures to be cut. This pattern includes an outermost groove 87 following and aligned with the margin of the aperture 65 in template 55 to form a pattern guide for the maximum size bait, an interior groove 89 which with part of groove 87 forms a pattern guide for the intermediate size bait, and another interior groove 91 which with part of groove 87 forms a pattern guide for the small size bait. All of these grooves are continued as indicated at 93 at the sharp corners 95 of the figures thereby defined with the continuations in alignment with the respective slots 73, 77, 81 and 83 according to the position of the slide 53.

The cutting board 51 and the template 55 are provided with aligned notches 97 and 99 in their ends to provide for access of the fingers of the user to the slide 53 to slide it to the desired position.

In using the guide of Fig. 7 to cut baits, the templates 53 and 55 are separated from the cutting board 51 by loosening the wing nuts 59. A sheet or slab of bait-forming material S is inserted between the board and template 53 to underlie the aperture 65 in template 55. The template 53 is then adjusted by sliding it transversely to the position for cutting the desired bait, and the wing nuts are tightened to clamp the bait-forming material in place. If it is desired to cut the bait B-1, the slide 53 is moved to its Fig. 8 position wherein the apertures 63 and 65 are aligned so that aperture 65 is unblocked. The user may then insert a cutting blade through the aligned apertures and draw it around their margins to cut through the material, the point of the blade being guided in the groove 87 of the cutting board. At the sharp corners of the bait outline, the user draws the blade across the intersection into the continuations of the slots in the templates and the grooves in the cutting board to make intersecting cuts at the sharp corners of the bait figure. This cuts the bait figure B-1 with clean sharp corners and permits it to be readily removed.

If it is desired to cut the bait B-2, the slide 53 is adjusted to its Fig. 10 position wherein the slide partly blocks the aperture 65, leaving an intermediate-sized aperture through the template-slide assembly to the cutting board. Slots in template 55 line up with slots in slide 53 and with the respective continuations of the grooves in the cutting board at the sharp corners of this intermediate-sized aperture for cutting clean sharp corners. If it is desired to cut the bait B-3, the slide is adjusted to its Fig. 12 position, leaving a small-sized aperture leading through the template-slide assembly to the cutting board. Again, slots in template 55 line up with slots in slide 53 and with the respective continuations of the grooves in the cutting board at the sharp corners of this small-sized aperture for cutting clean sharp corners.

It will be understood from inspection of Figs. 7, 8, 10 and 12 that the slide 53 may be adjusted to the left, as well as to the right as shown, to position it for cutting the different baits.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A cutting guide particularly for cutting fishing baits comprising a clamp having a cutting board as one jaw thereof and a template as the other jaw thereof for clamping a sheet or slab of material therebetween, said template having an aperture therethrough in the outline of a figure to be cut by inserting a cutting blade through the aperture and drawing the blade around the margin of the aperture as a guide, said template also being provided with slots forming continuations of the margin of said aperture at corners thereof, said cutting board being provided with a blade-receiving groove in the face thereof toward the template, said groove following a figure slightly smaller than the aperture so that it is located just within the margin of the aperture, said groove having continuations at corners thereof in alignment with the slots in the template, a cut-out figure being removable through the aperture without separating the board and template.

2. A cutting guide particularly for cutting fishing baits comprising a double clamp having a cutting board as an intermediate jaw and a pair of templates as outer jaws for clamping sheets or slabs of material between the cutting board and templates, each template having at least one aperture therethrough in the outline of a figure to be cut by inserting a cutting blade through the aperture and drawing the blade around the margin of the aperture as a guide, each template also being provided with slots forming continuations of the margin of its aperture at corners thereof, said cutting board being provided in each face thereof with blade-receiving grooves corresponding to the apertures in the templates, each groove following the outline of its respective aperture and defining a figure slightly smaller than the aperture so that it is located just within the margin of the aperture, each groove having continuations at corners thereof in alignment with the slots leading from its respective aperture in the templates, cut-out figures being removable through the apertures without separating the board and templates.

3. A cutting guide particularly for cutting fishing baits comprising a clamp having a cutting board and a template as the jaws thereof for clamping a sheet or slab of material therebetween, clamp bolts extending through the board and template and having nuts threaded thereon for holding the board and template in assembled relation and for drawing the board and template together for clamping purposes, said template having an aperture therethrough in the outline of a figure to be cut by inserting a cutting blade through the aperture and drawing the blade around the margin of the aperture as a guide, said template also being provided with slots forming continuations of the margin of the aperture at corners thereof, said cutting board being provided with a blade-receiving groove in the face thereof toward the template, said groove following the outline of the aperture and defining a figure slightly smaller than the aperture so that it is located just within the margin of the aperture, said groove having continuations at corners thereof in alignment with the slots in the template, a cut-out figure being removable through the aperture without separating the board and template.

4. A cutting guide comprising a clamp having a cutting board as one jaw thereof and a pair of templates as the other jaw thereof for clamping material to be cut therebetween, each of said templates having apertures of substantially identical outline, one of said templates being mounted for sliding movement transverse to the other and being movable from a position wherein said apertures are wholly aligned to other positions wherein parts of said apertures are blocked.

5. A cutting guide comprising a clamp having a cutting board as one jaw thereof and a pair of templates as the other jaw thereof for clamping material to be cut therebetween, each of said templates having apertures of substantially identical outline, one of said templates being mounted for sliding movement transverse to the other and being movable from a position wherein said apertures are wholly aligned to another position wherein it blocks off part of the aperture in the other template, and wherein said other template blocks off part of the aperture in the sliding template, each of said templates having slots forming continuations of the margins of the apertures therein at corners of the apertures and additional slots located to form continuations of the unblocked portions of the margins of the apertures when the sliding template is in its said other position.

6. A cutting guide comprising a clamp having a cutting board as one jaw thereof and a pair of templates as the other jaw thereof for clamping material to be cut therebetween, each of said templates having apertures of substantially identical outline, one of said templates being mounted for sliding movement transverse to the other and being movable from a position wherein said apertures are wholly aligned to another position wherein it blocks off part of the aperture in the other template, and wherein said other template blocks off part of the aperture in the sliding template, each of said templates having slots forming continuations of the margins of the apertures therein at corners of the apertures and additional slots located to form continuations of the unblocked portions of the margins of the apertures when the sliding template is in its said other position, said cutting board having a pattern of blade-receiving grooves in the face thereof toward the templates including an outer groove following the outline of the aperture in said other template and just within the outline of said aperture, and an inner groove defining with part of said outer groove the outline of the unblocked margins of the apertures when the sliding template is in its said other position, said grooves having continuations at corners thereof alignable with the slots in the templates.

7. A cutting guide comprising a clamp having a cutting board as one jaw thereof and a pair of templates as the other jaw thereof, said templates lying flat against one another and associated with the board by means of clamp bolts extending through the templates and board, said bolts extending through elongate slots in one of said templates so that said one template constitutes a slide adjustable transversely relative to the other template, each of said templates having apertures of substantially identical outline, the sliding template being mounted for movement between a position wherein said apertures are wholly aligned to other positions wherein parts of said apertures are blocked.

8. A cutting guide comprising a clamp having a cutting board as one jaw thereof and a pair of templates as the other jaw thereof, said templates lying flat against one another and associated with the board by means of clamp bolts extending through the templates and board, said bolts extending through elongate slots in one of said templates so that said one template constitutes a slide adjustable transversely relative to the other template, each of said templates having apertures of substantially identical outline, the sliding template being mounted for movement between a position wherein said apertures are wholly aligned to another position wherein it blocks off part of the aperture in the other template, and wherein said other template blocks off part of the aperture in the sliding template, each of said templates having slots forming continuations of the margins of the apertures therein at corners of the apertures and additional slots located to form continuations of the unblocked portions of the margins of the apertures when the sliding template is in its said other position.

9. A cutting guide comprising a clamp having a cutting board as one jaw thereof and a pair of templates as the other jaw thereof, said templates lying flat against one another and associated with the board by means of clamp bolts extending through the templates and board, said bolts extending through elongate slots in one of said templates so that said one template constitutes a slide adjustable transversely relative to the other template, each of said templates having apertures of substantially identical outline, the sliding template being mounted for movement between a position wherein said apertures are wholly aligned to another position wherein it blocks off part of the aperture in the other template, and wherein said other template blocks off part of the aperture in the sliding template, each of said templates having slots forming continuations of the margins of the apertures therein at corners of the apertures and additional slots located to form continuations of the unblocked portions of the margins of the apertures when the sliding template is in its said other position, said cutting board having a pattern of blade-receiving grooves in the face thereof toward the templates including an outer groove following the outline of the aperture in said other template and just within the outline of said aperture, and an inner groove defining with part of said outer groove the outline of the unblocked margins of the apertures when the sliding template is in its said other position, said grooves having continuations at corners thereof alignable with the slots in the template.

10. A cutting guide comprising a clamp having a cutting board as one jaw thereof and a pair of relatively movable adjacent templates on one side of the board to function as the other jaw thereof, means for adjustably forcing said jaw-forming templates toward the cutting board in any relatively adjusted position of said templates, with bait material between the templates and the board, said board having grooves forming multiple outlines, and each of said templates carrying outlines adapted upon adjustment selectively to register with parts of said multiple outlines.

11. A cutting guide comprising a clamp having a cutting board as one jaw thereof and a pair of relatively movable adjacent templates on one side of the board to function as the other jaw thereof, means for adjustably forcing said jaw-forming templates toward the cutting board in any relatively adjusted position of said templates, with bait material between the templates and the board, said board having crossed grooves forming multiple outlines, and each of said templates carrying outlines adapted upon adjustment selectively to register with parts of said multiple outlines, said outlines of the templates having multiple extensions adapted selectively to register with various crossings of said multiple grooves in the cutting board.

DANIEL F. HYLAND.

REFERENCES CITED

The following references are of record in the file of this patent:

UNITED STATES PATENTS

| Number | Name | Date |
| --- | --- | --- |
| Re. 18,201 | Messmer, Jr. | Sept. 22, 1931 |
| 155,073 | Eager | Sept. 15, 1874 |
| 328,995 | Andrews | Oct. 27, 1885 |
| 778,233 | Enyart | Dec. 27, 1904 |
| 794,921 | Blood | July 18, 1905 |
| 1,258,213 | Grothkopf | Mar. 5, 1918 |
| 1,585,012 | Biersdorf | May 18, 1926 |
| 1,854,027 | Gruenhagen | Apr. 12, 1932 |

FOREIGN PATENTS

| Number | Country | Date |
| --- | --- | --- |
| 17,405 | Great Britain | Aug. 30, 1901 |